(12) United States Patent
Geltinger et al.

(10) Patent No.: US 8,944,794 B2
(45) Date of Patent: Feb. 3, 2015

(54) BLOWING MACHINE WITH DEMOUNTABLE BLOWING STATIONS

(75) Inventors: Florian Geltinger, Neutraubling (DE); Eduard Handschuh, Neutraubling (DE); Josef Hausladen, Neutraubling (DE); Thomas Hoellriegl, Neutraubling (DE); Ulrich Lappe, Neutraubling (DE); Michael Neubauer, Neutraubling (DE); Thomas Philipp, Neutraubling (DE); Juergen Soellner, Neutraubling (DE); Klaus Voth, Neutraubling (DE)

(73) Assignee: Krones AG (DE)

( * ) Notice: Subject to any disclaimer, the term of this patent is extended or adjusted under 35 U.S.C. 154(b) by 203 days.

(21) Appl. No.: 13/604,473

(22) Filed: Sep. 5, 2012

(65) Prior Publication Data
US 2013/0064920 A1 Mar. 14, 2013

(30) Foreign Application Priority Data

Sep. 13, 2011 (DE) .......................... 10 2011 053 577

(51) Int. Cl.
*B29C 49/36* (2006.01)
*B29C 33/30* (2006.01)
*B29C 49/42* (2006.01)
(Continued)

(52) U.S. Cl.
CPC ............... *B29C 49/42* (2013.01); *B29C 33/306* (2013.01); *B29C 49/36* (2013.01); *B29C 2049/4697* (2013.01); *B29C 2049/4856* (2013.01); *B29C 49/06* (2013.01)
USPC ........... 425/73; 29/401.1; 29/426.1; 425/186; 425/195; 425/522; 425/540; 425/541

(58) Field of Classification Search
CPC ............... B29C 2049/4697; B29C 2049/4856; B29C 2049/4858; B29C 49/30; B29C 49/32; B29C 49/34; B29C 49/36; B29C 49/38; B29C 30/30; B29C 30/305; B29C 30/306; B29C 33/30; B29C 33/305; B29C 33/306
USPC ........... 425/73, 182, 186, 195, 522, 540, 541; 29/401.1, 426.1, 428
See application file for complete search history.

(56) References Cited

U.S. PATENT DOCUMENTS 8,454,342 B2 * 6/2013 Mathy et al. .................. 425/195
8,591,215 B2 * 11/2013 Duclos et al. ................. 425/150
(Continued)

FOREIGN PATENT DOCUMENTS

| DE | 102009039695 | 3/2011 | ............. B29C 33/30 |
| DE | 102009039696 | 3/2011 | ............. B29C 49/48 |
| WO | WO 2010/020529 | 2/2010 | ............. B29C 49/36 |

OTHER PUBLICATIONS

German Search Report issued in corresponding application No. 102011053577.2, dated Sep. 12, 2012 (4 pgs).

*Primary Examiner* — Robert B Davis
(74) *Attorney, Agent, or Firm* — Hayes Soloway P.C.

(57) ABSTRACT

A device for forming plastic preforms into plastic containers with a mobile carrier on which is arranged a plurality of blowing stations, each comprising blow mold carrier parts to hold blow mold parts, wherein at least one of these blow mold carrier parts is mobile in relation to the other blow mold carrier part, and wherein the blowing stations each comprise a carrier element to carry at least one blow mold carrier part. The device includes a clean room within which the plastic preforms can be expanded into plastic containers. The blow mold carrier parts together with the carrier element form a unit which can be demounted as a whole from the carrier.

13 Claims, 7 Drawing Sheets

(51) Int. Cl.
*B29C 49/46* (2006.01)
*B29C 49/48* (2006.01)
*B29C 49/06* (2006.01)

(56) References Cited

U.S. PATENT DOCUMENTS 8,770,957 B2* 7/2014 Laumer ........................... 425/73
2006/0233909 A1 10/2006 Perez et al. .................... 425/540
2009/0178264 A1* 7/2009 Stoiber ........................ 29/401.1
2011/0052747 A1 3/2011 Meinzinger ................... 425/541
2011/0057342 A1 3/2011 Meinzinger et al. ............ 264/39
2011/0133369 A1 6/2011 Martini et al. ................ 264/523
2012/0091636 A1* 4/2012 Voth et al. .................... 264/535
2012/0225158 A1* 9/2012 Voth et al. .................... 425/540
2012/0248659 A1* 10/2012 Neubauer et al. ............. 264/523
2013/0040009 A1* 2/2013 Laumer ........................ 425/182

* cited by examiner

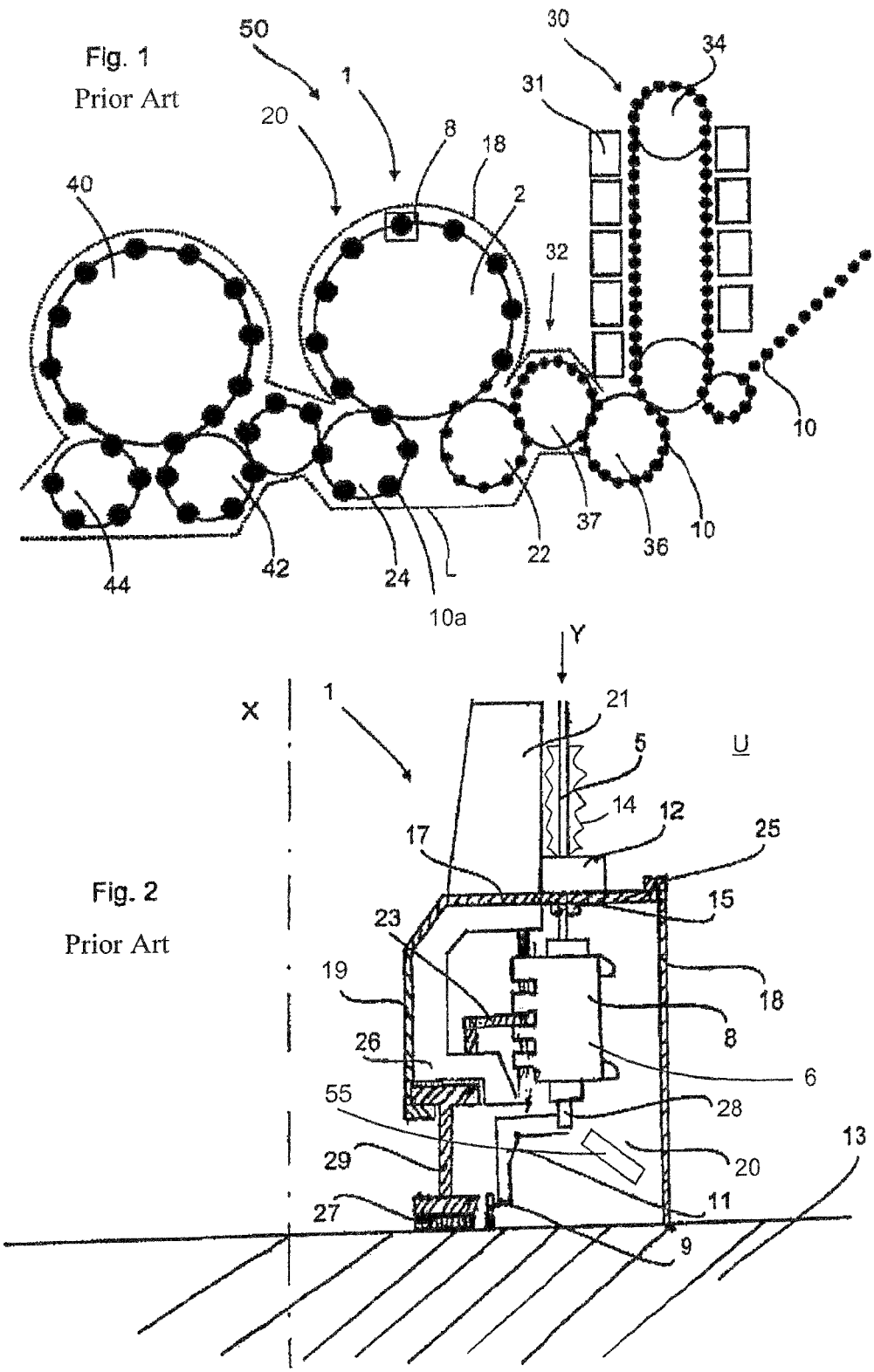

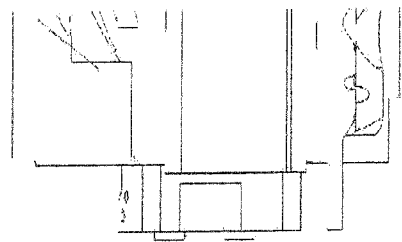
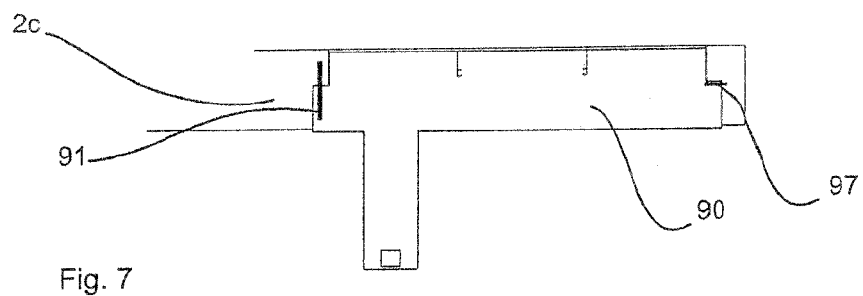
Fig. 7
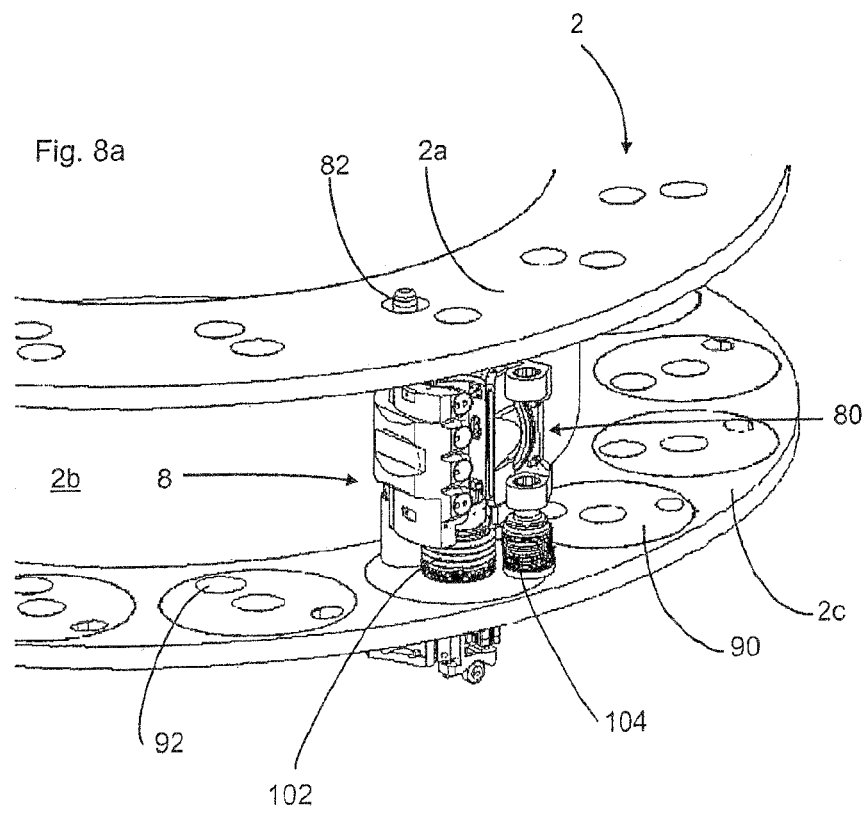
Fig. 8a

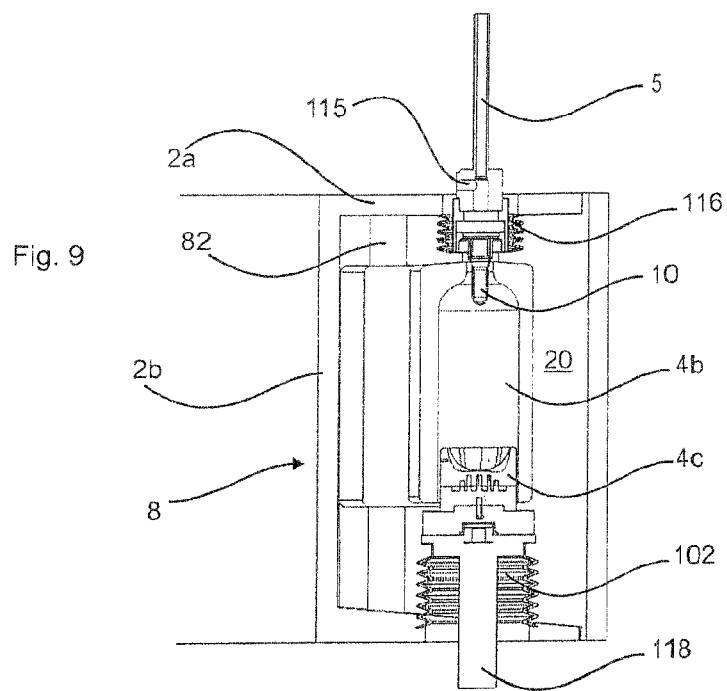
Fig. 9
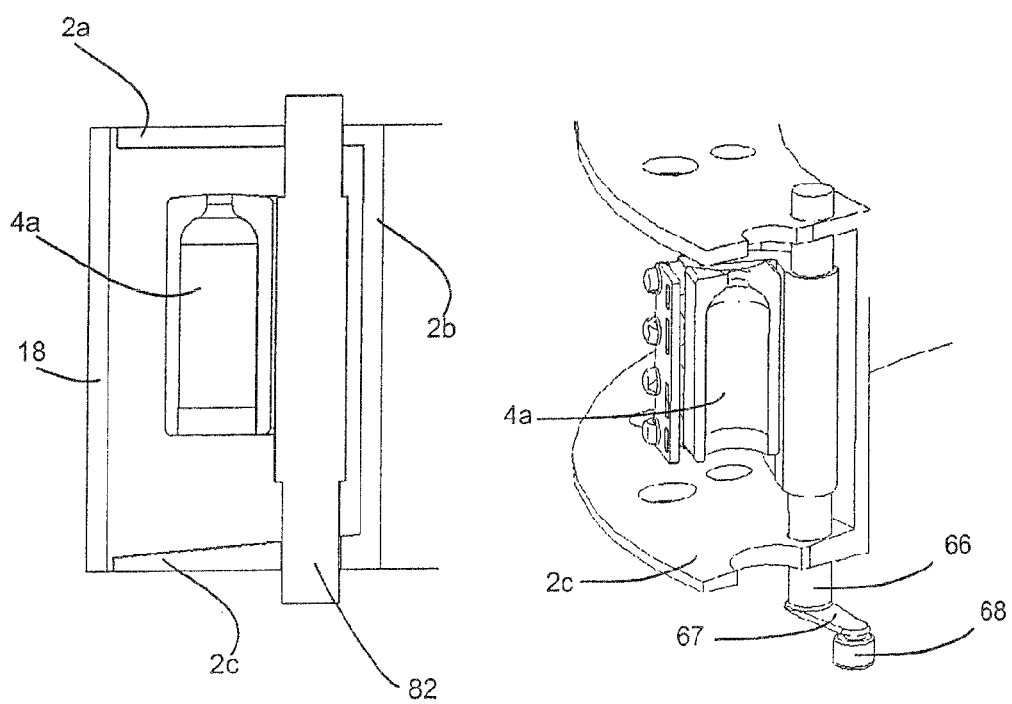
Fig. 10
Fig. 11

BLOWING MACHINE WITH DEMOUNTABLE BLOWING STATIONS

BACKGROUND OF THE INVENTION

The present invention relates to a device for forming plastic preforms into plastic containers. Such devices are known from the prior art. For example WO 2010 020 529 A2 describes an aseptic blowing machine. This blowing machine has a clean room in which the blowing machine stations are arranged. The disclosure content of WO 2010 020 529 A2 is hereby made by reference a constituent part of the disclosure content of the present application.

One problem in particular with aseptic blowing machines is that, because of the clean rooms, these machines are relatively inaccessible for example for assembly purposes.

The present invention is therefore based on the object of improving the assembly possibilities for such devices for forming plastic preforms into plastic containers.

SUMMARY OF THE INVENTION

A device according to the invention for forming plastic preforms into plastic containers comprises a mobile carrier on which is arranged a plurality of blowing stations, wherein these blowing stations each have blow mould carrier parts to hold blow mould parts and at least one of these blow mould carrier parts is mobile in relation to the other blow mould carrier part to open and close the blow moulds. Furthermore the blowing stations each have a carrier element for carrying at least one blow mould carrier part. Furthermore the device advantageously has a clean room within which the plastic preforms can be expanded into plastic containers.

According to the invention the blow mould carrier parts with the carrier element form a unit which is demountable as whole from the carrier. The terms mounting and demounting of a unit here means in particular that the individual elements or components of this unit are not dismounted from or mounted to each other during installation of the unit as a whole, and these elements preferably retain their geometric arrangement to each other during installation.

It is therefore proposed that the blowing stations or blowing stations as a whole are formed as a unit, wherein this unit can be removed from the mobile carrier. Advantageously the mobile carrier is a rotatable carrier and advantageously a so-called blowing wheel. Here advantageously at least the mould carrier parts with their carriers form a unit which can be demounted as a whole. Furthermore it is however possible that the blowing stations comprise further elements which can also be mounted and demounted together with the mould carrier parts, such as for example locking mechanisms for locking the two mould carrier parts, blowing nozzles, blow mould parts such as the side parts of the blow mould and also the base parts of the blow mould or similar.

Advantageously the demountable unit of the blowing station can be separated from or connected to the media connections. Here it is possible for lines such as hoses to be located inside or outside the clean room in order to transport the media from the rotary distributor to the respective blowing stations. These hoses can be detached or connected for example using coupling plugs or screw fittings. The decoupling points are located either directly on the mould carrier, at some point in the clean room or also outside the clean room.

In an advantageous embodiment, the mobile carrier moves the blowing stations in a predefined transport plane and for the purposes of mounting on a carrier or demounting from the carrier, the unit can be moved in a direction perpendicular to this plane.

Thus it is possible for example for the carrier to have recesses which are advantageously circular or oval in order to be able to seal the transition region optimally, or they can also be formed rectangular. Furthermore by utilising the recesses it is possible to insert the blowing stations from below or from above. Here it is possible for the individual components of the blowing station or the blowing station itself to be located on a plate which passes (at least partly) through this recess of the carrier or blowing wheel. In this way the blowing stations can easily be preassembled and then inserted complete in the carrier. For maintenance purposes the entire blowing station can be moved up or down and preferably lowered downwards out of the carrier. Here it is also possible for the blowing station to be placed on a supporting frame, wherein this supporting frame is advantageously equipped with rollers to allow rapid and simple transport of the station to a maintenance site.

It is therefore proposed that the blowing station is removed in a vertical direction or in a direction which runs perpendicular to the movement path of the blowing station, wherein in a particularly favourable manner blowing stations can be exchanged without the need to remove walls of the carrier arranged in the peripheral direction or delimiting walls of a clean room.

Alternatively it is however also possible to design the demountable unit such that the entire clean room is assembled from individual segments. This means that the blowing station is preassembled in each case with a part region of the cover wall, the side wall, the floor wall or the later fixed wall. Then the individual segments are connected together on the blowing wheel. To connect the respective segments, sealing devices are fitted.

In a further advantageous embodiment at least one blowing station and preferably each blowing station has a holding body which is arranged releasably on the carrier and on which the unit is arranged. Furthermore it is also possible not to connect the holding body with the blowing station unit but to remove the holding body individually. For example this can be a plate-like element which is inserted in said recesses. Here it is possible that the plate-like element is for example turned into the recess. It would however also be possible for the plate-like element to be locked to the opening in another manner. Advantageously the carrier comprises a plurality of openings through which the blowing stations can be inserted. Advantageously the carrier element is arranged on the holding body and can thus be removed from the carrier together with this. In the embodiment the holding body also forms part of the unit which can be removed as a whole from the carrier. It would also be conceivable for two holding bodies to be provided which receive the blowing station between them.

Advantageously a sealing device is provided in at least one region between said holding body and the carrier. In this way a clean room can be guaranteed to be maintained although said holding body can be detached from the carrier. Furthermore also advantageously sealing devices are arranged between all parts which pass through the clean room wall and the clean room wall.

In a further advantageous embodiment the carrier has a peripheral recess in which the blowing stations are arranged. Thus for example the carrier can have a C-shaped profile on its outer periphery, wherein the individual blowing stations are arranged in the recess thus formed. This will be explained in more detail with reference to the figures.

Here it is possible for the clean room to be formed annular and substantially surround the plastic preforms or individual blowing stations. It is particularly preferably possible here that the mould carrier parts and hence also the blow mould parts move inside this clean room. Furthermore it is possible that drives to move the mould carrier parts are arranged for example outside this clean room. The blowing stations known from the prior art are often unsuitable for aseptic applications. Due to a plurality of bearing points, screw fittings, undercuts, overlaps and similar, it is often difficult to maintain a clean room. Each of said points entails a risk of contamination. For this reason efficient sterilisation before production begins is not easily possible. Here it is proposed according to the invention to design both the carrier and the blowing stations located therein for ease of assembly and maintenance. Advantageously at least one delimitation of the clean room is formed by a region of the carrier, for example by said C-shaped profile. Furthermore it is advantageously possible for the blowing stations to be arranged on a delimiting wall of the clean room. Advantageously the openings through with the blow moulds are introduced into the carrier are also arranged in a delimiting wall of the clean room.

In a further advantageous embodiment one blow mould carrier part is arranged rigid in relation to the carrier and the other blow mould carrier part is arranged mobile in relation to the carrier. Here advantageously the carrier i.e. the blowing wheel serves as a receiver element for the blowing stations. One of the two blow mould carrier parts is here arranged mobile on or in the blowing wheel. Advantageously bearing elements which serve to bear a movement of the mould carrier part are provided outside the clean room. Here they are advantageously protected from cleaning and sterilisation media by a seal, which has a further positive effect of the service life.

Secondly when located outside the clean room, these components constitute no risk of contamination for the clean room atmosphere. The immobile mould carrier part however requires no bearing point. This part can be connected rigidly with the blowing wheel, or for example said carrier. Here it is possible that for example elements arranged fixedly, for example welded, in the blowing wheel serve as receivers for the immobile mould carrier side.

In an advantageous embodiment it is conceivable to provide two recesses i.e. one at the top and one at the bottom on which the rigid blow mould carrier part can be fixed releasably or permanently. Thus the unit can be demounted including the two holding bodies. It is pointed out that this embodiment with the blow mould carrier parts arranged fixedly on the blowing wheel is also conceivable independently of the invention mentioned above.

The applicant therefore reserves the right to claim protection for such an embodiment. In addition it would also be possible for the immobile mould carrier to be connected with the blowing wheel for example via bolts or similar. These bolts too can be arranged on said holding body and thus removed with this holding body from the carrier. Advantageously the mould carrier parts are suspended partly within the clean room i.e. they have as few bearing and contact points with the interior of the clean room as possible.

In a further advantageous embodiment the blow mould carrier part arranged rigidly in relation to the carrier is arranged obliquely in relation to a radial direction of the carrier, i.e. a separating plane between the two blow mould halves, in a closed state of the blow mould, runs obliquely in relation to the radial direction. A tilt angle between said plane and the radial direction of between 10° and 50° is advantageous, preferably between 30° and 50°. Advantageously here the blow mould carrier part is arranged rigidly on the carrier such that the blow mould or the blow mould part arranged on the blow mould carrier points obliquely outward. Advantageously at least one blow mould carrier is arranged pivotably on the carrier, wherein in particular a pivot axis extends particularly advantageously in the direction in which the blow mould can be removed from the carrier.

In a further advantageous embodiment the blow mould carrier part arranged rigidly on the carrier is arranged at least partly radially inside the mobile blow mould carrier part. This means that in a closed state of the blow mould, the rigidly arranged blow mould part is arranged at least partly radially inside the mobile blow mould carrier part and the blow mould part arranged thereon.

In a further advantageous embodiment at least one wall of the carrier has an opening through which a blowing station can be passed. Advantageously this is an enclosed opening i.e. for example a circular or polygonal opening.

Advantageously said opening is parallel to the transport plane in which the individual blowing stations are transported.

The present invention is furthermore directed at a method for demounting or mounting a device for forming plastic preforms into plastic containers. Here the device comprises a mobile carrier on which is arranged a plurality of blowing stations for forming plastic preforms into plastic containers. The blowing stations each have a first blow mould carrier part and a second blow mould carrier part. At least one of these blow mould carrier parts is moved in relation to the other blow mould carrier part to open and close a blow mould during a working operation of the device. According to the invention, for demounting or mounting of the device, the entire blowing station is removed from the carrier or arranged thereon. Also for mounting, the entire blowing station is arranged or mounted on the carrier. Advantageously for mounting and/or demounting the device, the entire blowing station is removed from the carrier in a direction which stands perpendicular to a transport path of the blowing stations during a working operation of the device.

Preferably the device in working operation has a clean room within which in working operation of the device the plastic preforms are expanded into plastic containers. The individual blowing stations here preferably move inside this clean room.

Further advantages and embodiments arise from the enclosed drawings:

BRIEF DESCRIPTION OF THE DRAWING

These show:

FIG. 1 a diagrammatic depiction of a plant for production of plastic containers;

FIG. 2 a view of a clean room in the region of a blowing station;

FIG. 7 a partial section view to illustrate the device according to the invention;

FIGS. 8a-8c three depictions to illustrate a device according to the invention;

FIG. 9 a further depiction of a device according to the invention;

FIG. 10 a section view of a device according to the invention;

FIG. 11 a further partial depiction of a device according to the invention;

DETAILED DESCRIPTION OF THE DRAWINGS

Figure 3:
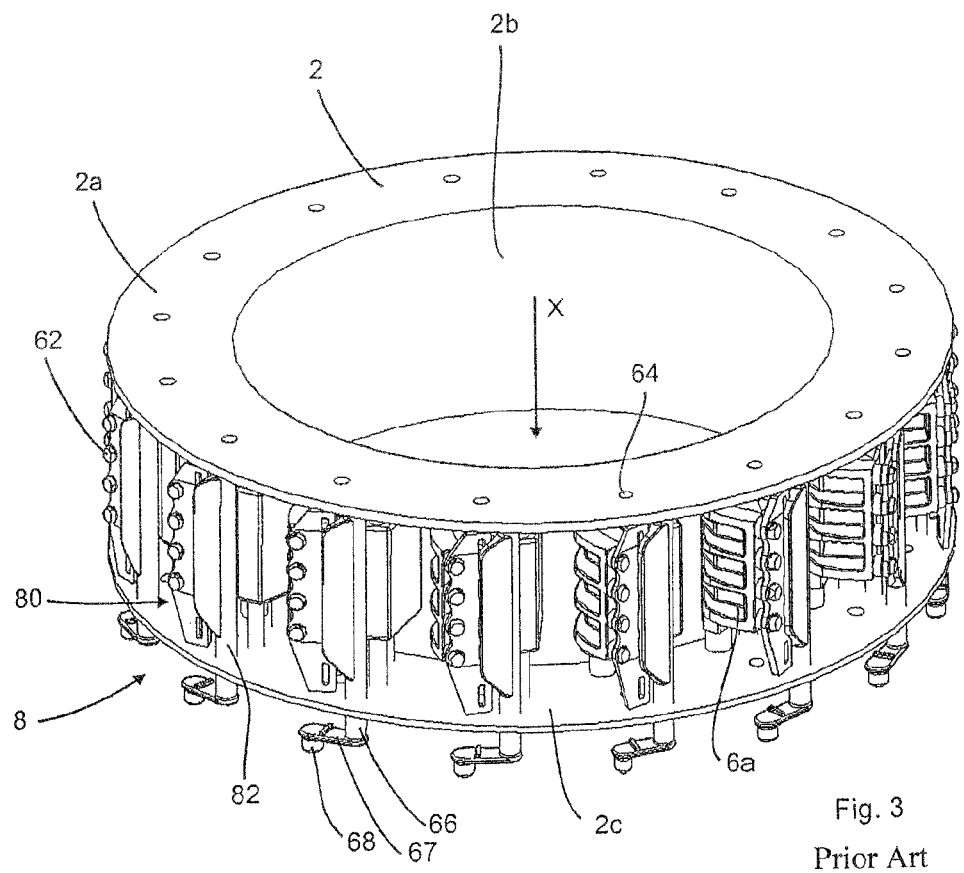
FIG. 3 a depiction of a carrier with forming station arranged thereon.

FIG. 1 shows a diagrammatic view of a plant for production of plastic containers according to the prior art. This plant 50 has a heating device 30 in which the plastic preforms 10 are heated. These plastic preforms 10 are guided by means of a transport device 34, such as a circulating chain here, through this heating device 30 and thus heated by a plurality of heating elements 31. This heating device 30 is followed by a delivery unit 36 which delivers the preforms 10 to a sterilising device 32. This sterilisation device 32 here also comprises a transport wheel 37 and sterilisation elements can be arranged on this transport wheel 37 or stationary. In this region for example sterilisation is possible by hydrogen peroxide gas or also by electromagnetic radiation. In particular in this region internal sterilisation of the preforms is carried out.

Reference numeral 20 as a whole designates a clean room, the outer limits of which are here indicated by the dotted line L. In a further preferred embodiment the clean room 20 is arranged not only in the region of the transport wheel 2 and filling device 40 but possibly may begin even in the region of the heating device 30, the sterilisation device 32, the plastic preform supply and/or the plastic preform production. It is evident that this clean room 20 begins in the region of the sterilisation unit 32. In this region lock devices can be provided for introduction of the plastic preforms into the clean room 20 without too much gas flowing inside the clean room and thus being lost.

The clean room as indicated by the dotted line L is adapted to the outer shape of the individual plant components. In this way the volume of the clean room can be reduced.

The reference numeral 1 as a whole designates a forming device in which on a transport wheel 2 is arranged a plurality of blowing stations or blowing stations 8, wherein here only one of these blowing stations 8 is shown. With these blowing stations 8, the plastic preforms 10 are expanded into containers 10a. Although not shown here in detail, the entire region of the transport device 2 does not lie inside the clean room 20 but the clean room 20 or isolator is to some degree designed as a mini-isolator within the entire device. Thus it would be possible for the clean room to be produced in the manner of a channel at least in the region of the moulding device 1.

Reference numeral 22 designates a supply device which delivers the preforms to the forming device 1 and reference numeral 24 refers to a discharge device which discharges the produced plastic containers 20 from the forming device 1. It is evident that the clean room 20 has recesses in the region of the supply device 22 and discharge device 24 which hold these devices 22, 24. In this way the plastic preforms 10 can be delivered to the forming device 1 or the plastic containers 10a can be taken from the forming device 1 particularly advantageously.

With a delivery unit 42, the expanded plastic containers are delivered to a filling device 40 and then discharged from this filling device 40 via a further transport unit 44. Here the filling device 40 is also located inside said clean room 20. Also in the case of the filling device it would be possible to arrange inside the clean room 6 not the entire filling device 40 with for example a beverage reservoir, but here too only those regions in which the containers are actually guided. To this extent the filling device could be constructed in a manner similar to the device 1 for forming plastic preforms 10.

As stated the clean room 20 in the region of the device 1 is reduced to a smallest possible region, namely essentially the blowing station 8 itself. With this compact design of the clean room 20 it is possible to create a clean room easier and faster, and also maintaining sterility in the operating phase is less complex. Here less sterile air is required which leads to smaller filter plants and reduces the risk of uncontrolled turbulence formation.

FIG. 2 shows a detailed depiction of the device 1 according to the prior art in the region of a blowing station 8. A plurality of such blowing stations 8 is moved by a transport device 2 or a carrier rotating about axis X. The blowing station 8 as evident in FIG. 2 is guided within the clean room 20 which is here formed as a channel. This clean room 20 is closed via a moving side wall 19 and a cover 17 formed of one piece with this side wall 19. This side wall 19 and the cover 17 rotate with the blowing station 8.

Reference numeral 18 refers to a further wall which delimits the clean room 16. This wall 18 is here an external wall which is arranged stationary. Between the cover 17 and the wall 18 is provided a sealing device 25 which, for example as stated above using a water lock, seals the elements 17 and 18 which are mobile in relation to each other. The lower region of the wall 18 is arranged firmly sealing to the floor 13. Within the clean room 20 and here lying directly at the wall 19 is provided a carrier 26 which is also moved rotating and on which again a holding device 23 is provided which holds the blowing station 8.

Reference numeral 11 relates to a follower device which can be activated by a guide curve 9 in order to open and close the blowing station on its path through the clean room 6, in order in particular to insert the plastic preform in the blowing station and remove it again. Here a guide curve 9 is also arranged inside the clean room 20. It would however for example also be possible to guide one region 11 out of the clean room 20 below the individual blowing stations.

The transport device 2 can have further elements which are arranged above the clean room 20.

The carrier 26 is arranged fixedly on a holding body 29 and this holding body in turn is mobile in relation to the floor 13. Reference numeral 27 refers to a further sealing device which also achieves a seal in this area of regions 13 and 29 which are mobile in relation to each other.

Reference numeral 5 relates to a stretching rod which is mobile in relation to the blowing station to stretch the plastic preforms 10 in their longitudinal direction. Here a slide 12 is arranged on the cover 17, in relation to which the stretching rod is mobile in direction Y. Reference numeral 21 refers to a further holder for this slide 12 of the stretching rod 5.

It is evident that certain regions of the stretching rod during the blowing process can lie both outside the clean room 20 and inside the clean room 20. To this end it is possible to provide outside the clean room 20 or above the slide 12 a protection device such as a gaiter 14 which surrounds the stretching rod 5 so that no region of the stretching rod 5 comes directly into contact with the outer environment. Reference symbol U designates the (unsterile) environment of the clean room 20. Reference numeral 28 designates a carrier for carrying a base mould which also forms part of the blow mould. This carrier is also mobile in direction Y.

Reference numeral 55 refers to a sterilisation device which is here arranged preferably inside the clean room 20 and serves to sterilise the individual blowing stations or parts of these blowing stations 8. This sterilisation device 55 can for example apply hydrogen peroxide or another sterilisation medium to the blowing stations 8. The sterilisation device 55 can be arranged stationary and the blowing stations can move in relation to the sterilisation device 55. This sterilisation device or application device 55 can be arranged on the transport wheel or on a standing wall 18, or generally be arranged stationary and consist of nozzles or similar. It is also advantageous to introduce sterile air for sterilising the clean room 20 into the clean room 20 via the ventilation system.

The blow moulds (not shown) are arranged inside the blow mould carrier 6. More precisely two blow mould carrier parts can be arranged which can swivel in relation to each other and each hold one blow mould part. By means of this swivel process, the blow moulds can be opened for introduction of plastic preforms and for removal of finished blown containers. This blow mould carriers and blow moulds are also arranged inside the clean room.

It would however also be possible (other than as shown in FIG. 2) and preferred for the transport device 2 or carrier to have a C-shaped outer periphery which also partially forms the outer walls of the clean room. Thus this C-shaped clean room wall rotates with the transport device 2 i.e. the blowing wheel. In this embodiment the lower delimitation of the clean room is spaced from the floor 13 and moves relative to the floor. In this way the clean room can be made even smaller than shown in FIG. 2. This C-shaped profile of the transport device, which here forms both an inner wall and a lower and upper cover of the clean room, is preferably sealed only against the outer wall of the clean room. This outer wall is advantageously arranged stationary.

FIG. 3 shows a depiction of a carrier 2 on which is arranged a plurality of blowing stations 8. The carrier 2 has a cover wall 2a, a side wall 2b and a floor wall 2c which are preferably formed of one piece with each other. These three walls 2a-2c are formed C-shaped, wherein the individual blowing stations are arranged in this C-shaped cross section in the peripheral direction of the carrier. The individual blowing stations 8 each have a first blow mould carrier part 6a which is arranged pivotable by means of a pivot shaft 82 which here runs parallel to the X direction. Reference numeral 66 relates to an extension of this pivot shaft to the outside i.e. outside the clean room. In this segment a lever 67 and a curve roller 68 are arranged. By means of this curve roller 68, a pivoting of the pivot shaft 82 and hence also a pivoting of the blow mould carrier part 6a can be achieved. Reference numeral 62 designates roughly schematically a locking mechanism with which the two blow mould carrier parts can be locked together during the expansion process.

The pivot shaft 82 here at the same time constitutes the carrier element 82 which serves to carry the blow mould carrier 6a. Furthermore it is also possible that the second blow mould carrier part (not shown) is hinged on or carried by the pivot shaft. Reference numeral 80 designates the unit which can be removed from the carrier and comprises at least the blow mould carrier part 6a and the carrier element 82, also however further elements such as the blow mould parts, a floor part of the blow mould and similar.

Figure 4:
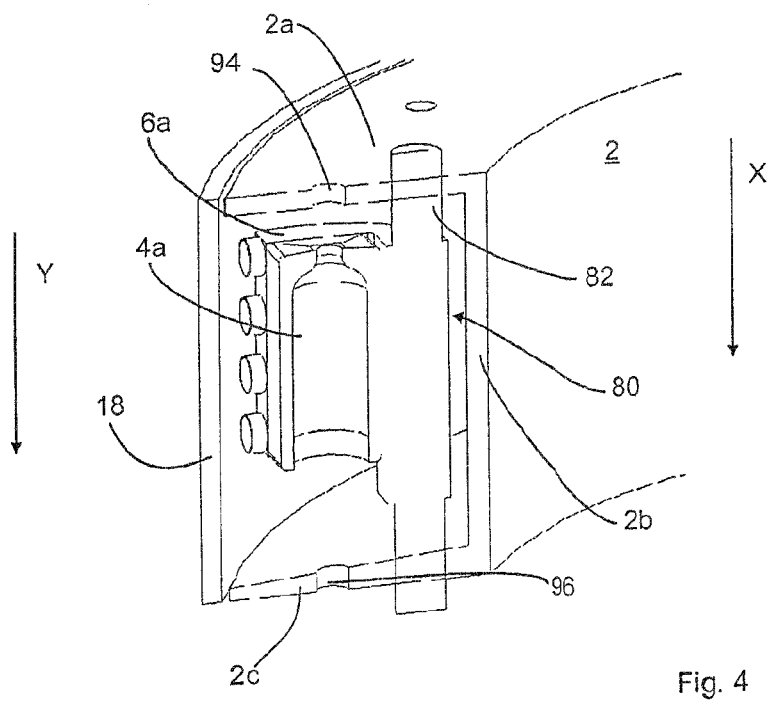
FIG. 4 a section view of a carrier with a partial depiction of a blowing station arranged thereon.

FIG. 4 shows a section view of a corresponding device. Here the pivot shaft 82 is shown which serves to pivot the blow mould carrier part 6a. On the blow mould carrier part is arranged a blow mould part 4a. Between this blow mould carrier part 6a and the blow mould part 4a can be arranged a pressure pad (not shown) which in working operation serves to move forward or load the blow mould part 4a onto a corresponding further blow mould part 4b (not shown).

The clean room 20 is here delimited by the wall 18 and the three walls 2a, 2b and 2c of the carrier 2. The pivot shaft 82 extends through an opening which is here arranged in walls 2a and 2c. Reference numerals 94 and 96 refer to the openings in the walls 2a and 2c through which elements mobile in direction Y can cooperate with the blow moulds 4a, 4b in working operation. Thus for example via the opening 94 an application device such as a blow nozzle, via which the plastic preform is subjected to compressed air, can be arranged on a carrier. Also via the opening 94 of the blowing station, a stretch rod can be advanced for expanding the plastic preforms.

Through the opening 96 a further carrier can be guided which for example carries a floor part of the blow mould (not shown) and also moves this floor part here up onto the blow mould part 4a to close the blow mould.

Figure 5:
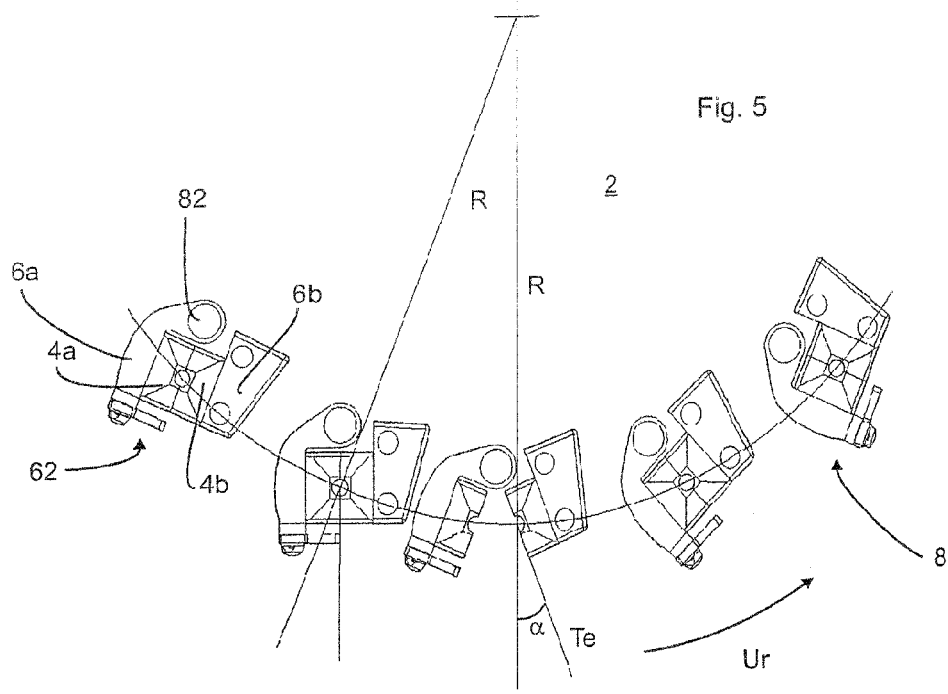
FIG. 5 a diagrammatic top view of a plurality of blowing stations.

FIG. 5 shows a diagrammatic depiction of a device according to the invention. In this embodiment a blow mould carrier part 6b is arranged rigidly in relation to the carrier 2 and the blow mould part 4b is arranged on this blow mould carrier part 6b. The first blow mould carrier part 6a is arranged swivelable in relation thereto by means of the pivot shaft 82 in order thus to open and close the blow mould. Here again diagrammatically part of the locking mechanism 62 is shown.

It is evident that the separating plane Te of the two blow mould parts 4a, 4b is here arranged at an angle α in relation to the radial direction R of the carrier. The movement direction of the blowing stations 8 in a working operation of the device is indicated by reference symbol UR.

Figure 6:
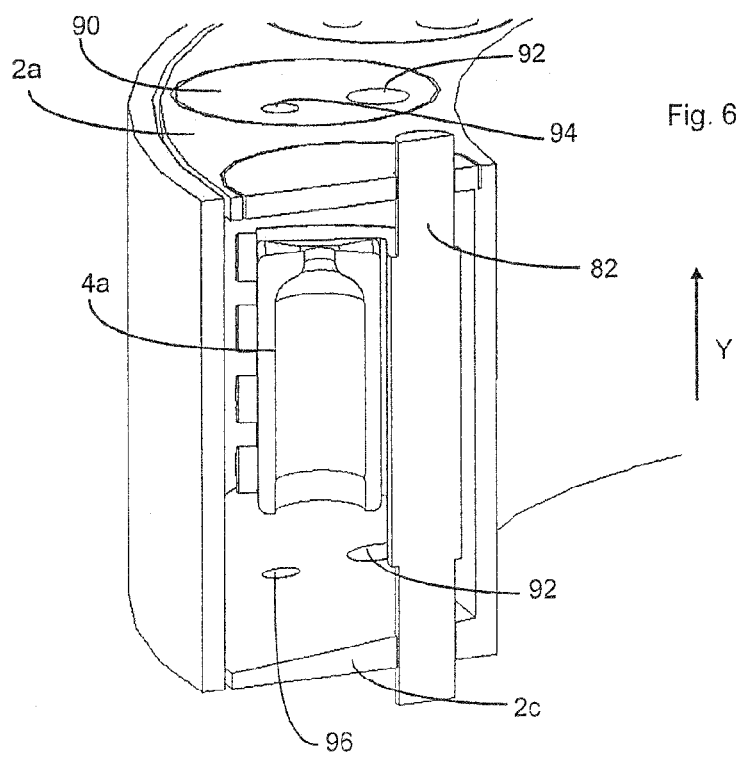
FIG. 6 a partial section view of a device according to the invention.

FIG. 6 shows a further depiction to illustrate the device according to the invention. Here is also a holding body 90 is provided on which the individual blowing stations are arranged. This holding body 90 has an opening 92 through which extends a segment of the pivot shaft 82. This holding body 90 can here be removed from the carrier 2. After removal of the holding body here the blowing station designated 8 can be removed upwards as a whole from the carrier. Thus here the blowing station 8 can be removed from the carrier by movement along arrow Y. The pivot shaft 82 is mounted swivelling in relation to the wall 26 and advantageously is also supported by means of bearing devices (not shown). Furthermore it is possible for a seal (not shown) to be provided in order to seal the movement of the pivot shaft 82 in relation to the carrier 2.

Advantageously a device is provided which for example can also be arranged on the forming arrangement and which lifts the complete blowing station 8 including holding body or plate 90 upwards. Such a device can also lower the blowing station onto a transport frame.

For this various procedures are possible. Thus for example a lifting device can raise the blowing station for example via spindles. Also hydraulic activation to raise the blowing station is conceivable. Alternatively any pneumatic, electromagnetic, electric or manual device can be used such as e.g. a crank or a lever mechanism to lower or raise the blowing station.

FIG. 7 shows a detailed view of a device according to the invention. Here again the holding body 90 is shown which for example is attached to the carrier 2 or the floor part 2a of the carrier 2 by means of screw connections 91 (indicated schematically only). Reference numeral 97 designates a sealing device which serves to seal the holding body or plate 90 against the carrier 2, or more precisely the wall 2c. This sealing device can for example by an O-ring or similar. A correspondingly designed plate could be also be provided alternatively or additionally in the upper wall 2a.

Figure 8B:
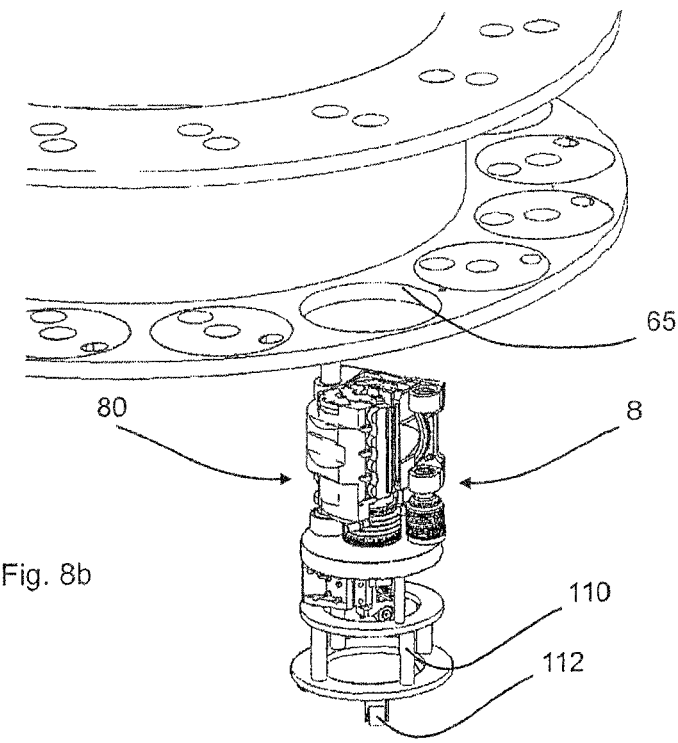
Figure 8C:
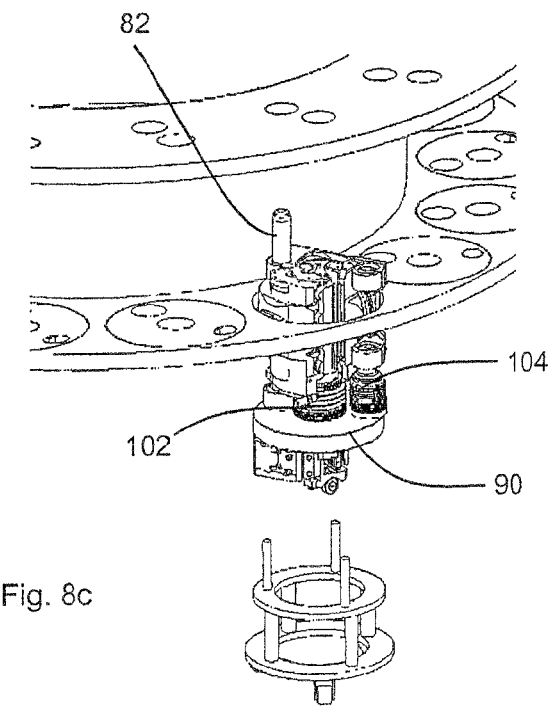

FIGS. 8a-8c illustrate the demounting (and conversely also the mounting) of a blowing station 8. The blowing station 8 can be raised from its withdrawal station (see FIG. 8b) and then screwed to the carrier 2. After this has been done, the lifting device or lift can be removed and the blowing wheel i.e. the carrier 2 can rotate further to the next station which can then also be removed or installed upwards. In the situation shown in FIG. 8a, the blowing station is already mounted on the carrier. Reference numerals 102 and 104 refer to sealing devices such as gaiters with which the lifting movements for example of a floor part, or also the rotary movement of a locking mechanism (not shown here) can be covered.

Reference numeral 110 in FIG. 8b shows a carrier device which for example can also be arranged on rollers 112. In the situation shown in FIG. 8c the blowing station 8 has just been moved through the opening 65 (see FIG. 8b) in order either to be mounted on the carrier 2 or removed therefrom. In this process the plate 90 or the holding body is guided from below onto the carrier and thus onto the clean room and attached thereto by means of screws. In addition a sealing device is proposed in order to seal the later resulting clean room to the outside.

In FIGS. 8a and 8b, reference numeral 80 again indicates the unit which can be removed from the carrier 2. This unit is essentially the entire blowing station with both blow mould carrier parts, both blow mould parts and also a floor part of the blow mould. Advantageously the unit 80 is the entire blowing station with all associated components which are required in particular to open and close the blow mould.

FIG. 9 shows a section view of a blowing station 8 according to the invention. Here again a blow mould part 4b is shown within which the plastic preform 10 can be expanded into the plastic container. Also the stretching rod 5 is shown and a channel 115 via which from the outside a medium such as for example sterile air is supplied to expand the plastic preform 10. Reference numeral 4c designates a floor part which here closes the blow moulds as a whole from below. The floor part is arranged on a carrier 118 and can thus be raised to the blow mould. Here again the sealing device 102 is shown which here again is a gaiter. In this way it is also possible to arrange drive devices for the carrier 118 outside the clean room 20. Reference numeral 116 designates a further sealing device which is here also formed as a gaiter and which serves to seal the movement of the application device or blow nozzle.

FIG. 10 shows a further embodiment wherein again the pivot shaft 82 can be seen with blow mould part 4a arranged thereon.

In the view shown in FIG. 11, the pivot shaft 82 can also be seen together with the lever arrangement 66, 67, 68 with which the blow mould part 4a is swivelled.

Figure 12:
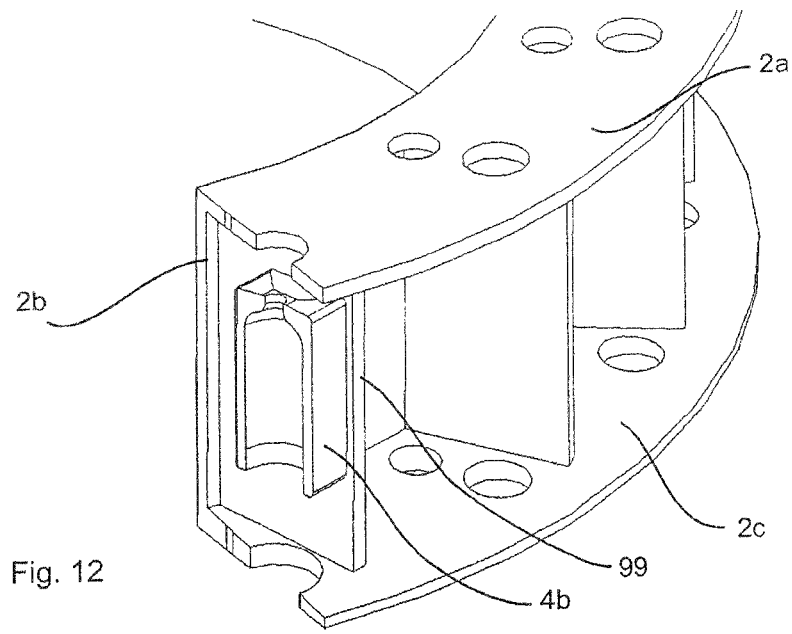
FIG. 12 a further embodiment of a device for forming plastic preforms.

FIG. 12 shows a further embodiment of a device for forming plastic preforms into plastic containers. In this embodiment a blow mould part 4b is arranged on a holding device 99, preferable fixedly or rigidly. This holding device can for example be welded to the carrier 2 or even be formed of one piece therewith. However it would also be conceivable for the carrier device 99 to be arranged fixedly on a holding body 90 (not shown) (see FIG. 8c) and be able to be removed together with this from the carrier 2. The embodiment shown in FIG. 12 preferably has no blow mould carrier part 6b as shown above. In this case the holding device 99 also functions as a blow mould carrier part. A locking mechanism for locking the blow mould parts (not shown) can here engage for example in the holding device 99. The holding device 99 furthermore has a reinforcing effect on the carrier 2.

Figure 13:
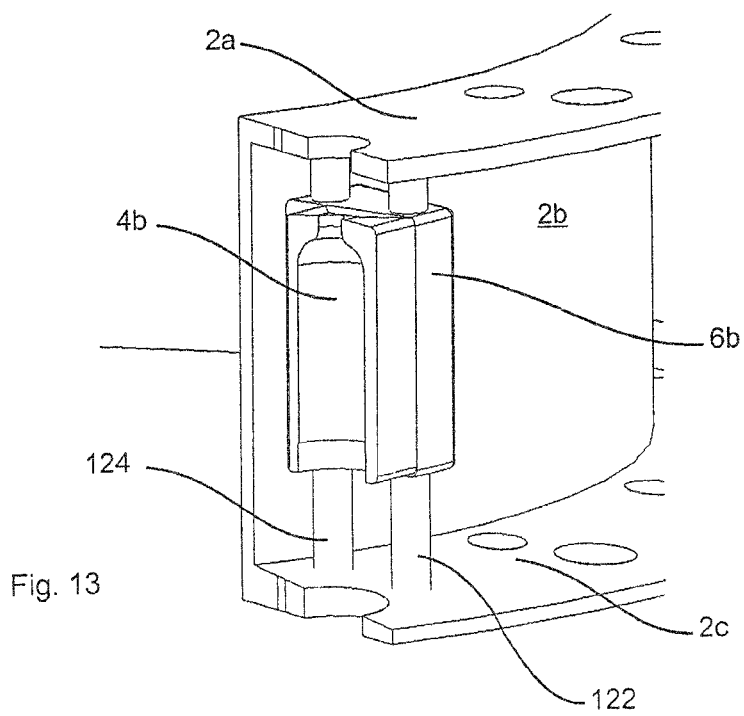
FIG. 13 a further embodiment of a device for forming plastic preforms.

FIG. 13 shows a further embodiment of a device for forming plastic preforms into plastic containers. In this embodiment the blow mould part 4b is arranged on a blow mould carrier part 6b and this blow mould carrier part 6b is again arranged on the carrier via bolts 122 and 124. In this embodiment a pressure pad which can be exposed to a gaseous medium can be arranged between the blow mould carrier parts. In the embodiment shown in FIG. 12 such a pressure pad could be provided between the holding device 99 and the blow mould part 4a. Bolts 122 and 124 could also be formed on the holding body 90 which preferably has a circular cross section.

The applicant reserves the right to claim all features disclosed in the application documents as essential to the invention where novel individually or in combination in relation to the prior art.

LIST OF REFERENCE SYMBOLS

1 Forming device
2 Transport wheel, carrier
2a-2c Walls of carrier 2
4a, 4b Blow moulding part
4c Floor part of blow mould
5 Stretching rod
6a, 6b Blow mould carrier part
8 Blowing station
9 Guide curve
10 Plastic preforms
10a Containers
11 Follower device
12 Slide
13 Floor
14 Gaiter
17 Cover
18 Wall
19 Mobile side wall
20 Clean room
21 Holder
22 Supply device
23 Holding device
24 Discharge device
25 Sealing device
26 Carrier
27 Sealing device
28 Carrier for carrying a base mould
29 Holding body
30 Heating device
31 Heating element
32 Sterilisation device
34 Transport device
36 Delivery unit
37 Transport wheel
40 Filling device
42 Delivery unit
44 Transport unit
50 Plant
55 Sterilisation device
62 Locking mechanism
65 Opening
66 Extension of pivot shaft
67 Lever
68 Curve roller
82 Pivot shaft, carrier element
90 Holding body
91 Screw connections
92 Opening
94 Opening in wall 2a
96 Opening in wall 2c 97 Sealing device
99 Holding device
102, 104 Sealing devices
110 Carrier device
112 Rollers
115 Channel
116 Sealing device
118 Carrier of floor part 4c
122, 124 Bolts
L Dotted line
R Radial direction
Te Separating plane
U (Unsterile) environment
UR Movement direction
X Axis, direction
Y Direction
α Angle

The invention claimed is:

1. A device for forming plastic preforms into plastic containers, said device having a mobile carrier on which is arranged a plurality of blowing stations, wherein each of the blowing stations comprise blow mould carrier parts for holding blow mould parts, and at least one of the blow mould carrier parts is mobile in relation to another blow mould carrier part to open and close the blow mould, and wherein the blowing stations each comprise a carrier element in the form of a pivot shaft for carrying at least one blow mould carrier part, wherein the device further comprises a clean room within which the plastic preforms can be expanded into plastic containers and, wherein the blow mould carrier parts together with the carrier element form a unit which can be demounted as a whole from the mobile carrier.

2. The device according to claim 1, wherein the mobile carrier moves the blowing stations in a predefined transport plane and the unit is mobile in a direction (Y) perpendicular to the predefined transport plane for the purpose of mounting to the mobile carrier or demounting from the mobile carrier.

3. The device according to claim 1, wherein at least one blowing station comprises a holding body which is arranged releasably on the mobile carrier and on which the unit is arranged.

4. The device according to claim 3, wherein a sealing device is provided in at least one region between the holding body and the mobile carrier.

5. The device according to claim 1, wherein the mobile carrier has a peripheral recess in which the blowing stations are arranged.

6. The device according to claim 1, wherein the one blow mould carrier part is arranged rigidly in relation to the mobile carrier and the other blow mould carrier part is arranged mobile in relation to the mobile carrier.

7. The device according to claim 6, wherein the one blow mould carrier part arranged rigidly on the mobile carrier is arranged at least partial radially inside the blow mould carrier part.

8. The device according to claim 1, wherein at least one wall of the mobile carrier comprises an opening through which a blowing station can be guided.

9. A method for demounting or mounting a device for forming plastic preforms into plastic containers, wherein the device has a mobile carrier on which is arranged a plurality of blowing stations for forming plastic preforms into plastic containers, wherein the blowing stations each comprise a carrier element in the form of a pivot shaft for carrying at least one blow mould carrier part, first blow mould carrier part and a second blow mould carrier part and at least one of the first and the second blow mould carrier parts is moved in relation to the other blow mould carrier part to open and close a blow mould during a working operation of the device, wherein for demounting or mounting of the device the entire blowing station is removed from the mobile carrier or arranged on the mobile carrier.

10. The device according to claim 1, wherein each blowing station comprises a holding body which is arranged releasably on the mobile carrier and on which the unit is arranged.

11. The device according to claim 1, wherein each blowing station includes a first blow mould carrier part which is arranged pivotably on a pivot shaft which runs parallel to a vertical direction.

12. The device according to claim 11, wherein the pivot shaft extends to outside the clean room.

13. The device according to claim 1, wherein the other blow mould carrier part is hinged on or carried by a pivot shaft.

* * * * *